(12) United States Patent
Nguyen et al.

(10) Patent No.: US 11,861,828 B2
(45) Date of Patent: Jan. 2, 2024

(54) AUTOMATED ESTIMATION OF MIDLINE SHIFT IN BRAIN CT IMAGES

(71) Applicant: Siemens Healthcare GmbH, Erlangen (DE)

(72) Inventors: Nguyen Nguyen, Columbia, MO (US); Youngjin Yoo, Princeton, NJ (US); Pascal Ceccaldi, New York, NY (US); Eli Gibson, Plainsboro, NJ (US); Andrei Chekkoury, Erlangen (DE)

(73) Assignee: Siemens Healthcare GmbH, Erlangen (DE)

( * ) Notice: Subject to any disclaimer, the term of this patent is extended or adjusted under 35 U.S.C. 154(b) by 441 days.

(21) Appl. No.: 17/303,932

(22) Filed: Jun. 10, 2021

(65) Prior Publication Data

US 2022/0067929 A1  Mar. 3, 2022

Related U.S. Application Data

(60) Provisional application No. 63/073,075, filed on Sep. 1, 2020.

(51) Int. Cl.
*G06T 7/00* (2017.01)

(52) U.S. Cl.
CPC .. *G06T 7/0012* (2013.01); *G06T 2207/10081* (2013.01); *G06T 2207/20081* (2013.01); *G06T 2207/20084* (2013.01); *G06T 2207/20101* (2013.01); *G06T 2207/30016* (2013.01)

(58) Field of Classification Search
CPC . G06T 2207/10081; G06T 2207/20081; G06T 2207/20084; G06T 2207/20101; G06T 2207/30016
USPC .......................................................... 382/128
See application file for complete search history.

(56) References Cited

U.S. PATENT DOCUMENTS

| 9,730,643 | B2 * | 8/2017 | Georgescu ........... G06V 10/772 |
| 11,200,664 | B2 * | 12/2021 | Yuh ............................ G06T 7/11 |
| 11,776,128 | B2 * | 10/2023 | Yoo ........................ G16H 50/50 |
| | | | 382/131 |
| 2018/0144467 | A1 * | 5/2018 | Sofka .................... A61B 5/4064 |
| 2019/0011521 | A1 * | 1/2019 | Sofka .................... G06F 18/2411 |
| 2019/0156937 | A1 * | 5/2019 | Shimomura ........... G16H 15/00 |

OTHER PUBLICATIONS

Extended European Search Report (EESR) dated Feb. 2, 2022 in corresponding European Patent Application No. 21194306.3.
(Continued)

*Primary Examiner* — Gabriel I Garcia

(57) ABSTRACT

Systems and methods for quantifying a shift of an anatomical object of a patient are provided. A 3D medical image of an anatomical object of a patient is received. An initial location of landmarks on the anatomical object in the 3D medical image is determined using a first machine learning network. A 2D slice depicting the initial location of the landmarks is extracted from the 3D medical image. The initial location of the landmarks in the 2D slice is refined using a second machine learning network. A shift of the anatomical object is quantified based on the refined location of the landmarks in the 2D slice. The quantified shift of the anatomical object is output.

20 Claims, 7 Drawing Sheets

(56) References Cited

OTHER PUBLICATIONS

Hye, Sun Yun et al: "Automated 3D cephalometric landmark identification using computerized tomography"; arxiv.org, Cornell University Library, 201 Olin Library Cornell University Ithaca, NY 14853, Dec. 16, 2020 (Dec. 16, 2020).

Prantik, Kundu et al: "Low-Field Point-of-Care MRI: Automated Estimates of Brain Midline Shift Correlate With Clinical Outcomes in Stroke"; Proceeding of The 2021 ISMRM & SMRT Annual Meeting & Exhibition, May 15-20, 2021, ISMRM, 2030 Addison Street, USA; No. 4025, Apr. 30, 2021 (Apr. 30, 2021).

Chilamkurthy, Sasank et al: "Deep learning algorizhms for detection of criticl findings in head CT scans: a retrospective study"; The Lancet; vol. 392, No. 10162, Oct. 11, 2018 (Oct. 11, 2018), pp. 2388-2396.

Van Zon, Mike et al: "Automatic cardiatic landmark localization by a recirrent neutral network"; Progress in Biomedical Optics and Imaging, SPIE—International Society for Optical Engineering, Bellingham, WA, US; vol. coa10949, 15 Marcy 2019 (Mar. 15, 2019), pp. 1094916-1094916.

Liao et al., "Automatic recognition of midline shift on brain CT images," 2010, Computers in Biology and Medicine, vol. 40, Issue 3, pp. 331-339.

Liu et al., "Automatic detection and quantification of brain midline shift using anatomical marker model," 2014, Computerized Medical Imaging and Graphics, vol. 38, Issue 1, pp. 1-14.

Jain et al., "Automatic Quantification of Computed Tomography Features in Acute Traumatic Brain Injury," 2019, Journal of Neurotrauma, vol. 36, No. 11, pp. 1794-1803.

Pisov et al., "Incorporating task-specific structural knowledge into cnns for brain midline shift detection," 2019, Interpretability of Machine Intelligence in Medical Image Computing and Multimodal Learning for Clinical Decision Support, ML-CDS 2019, IMIMIC 2019. Lecture Notes in Computer Science, vol. 11797, pp. 30-38.

Chilamkurthy et al., "Deep learning algorithms for detection of critical findings in head CT scans: a retrospective study," 2018, The Lancet, vol. 392, Issue 10162, pp. 2388-2396.

Liao et al., "Brain Midline Shift Measurement and Its Automation: A Review of Techniques and Algorithms," 2018, International Journal of Biomedical Imaging, vol. 2018, Article ID 4303161, 13 pages.

\* cited by examiner

FIG. 2
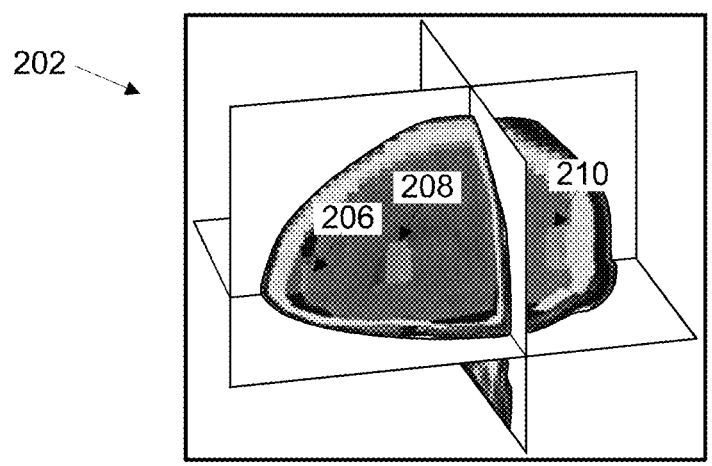
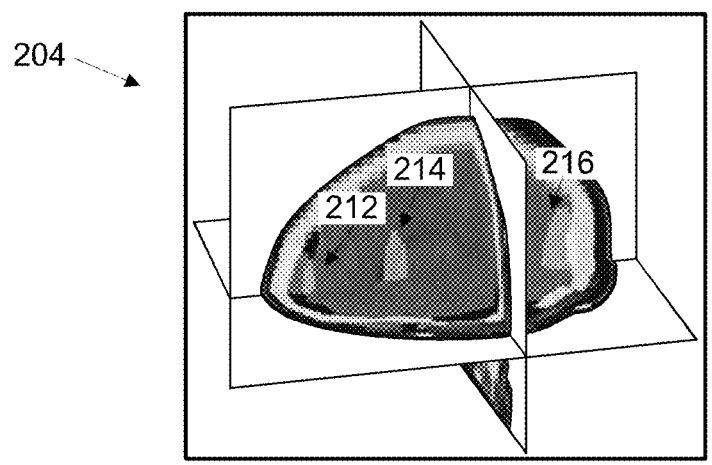

AUTOMATED ESTIMATION OF MIDLINE SHIFT IN BRAIN CT IMAGES

This application claims the benefit of U.S. Provisional Application No. 63/073,075, filed Sep. 1, 2020, the disclosure of which is herein incorporated by reference in its entirety.

TECHNICAL FIELD

The present invention relates generally to the automated estimation of midline shift in brain CT (computed tomography) images, and in particular to the automated estimation of midline shift in brain CT images using machine learning.

BACKGROUND

Midline shift is a shift or displacement of the brain past its center line. Midline shift is often associated with brain injuries due to, for example, trauma, stroke, or tumors. Midline shift may be used to determine the severity of cerebral hematoma and infarction. In the current clinical practice, midline shift is often quantified to assess the severity of a cerebral hematoma or infarction. Typically, a midline shift of more than 5 millimeters requires emergency surgery. More moderate midline shifts less than 5 millimeters may also require treatment. However, due to the variability in tissue distortion due to underlying pathology and patient anatomy, accurate detection and quantification of midline shift is challenging.

BRIEF SUMMARY OF THE INVENTION

In accordance with one or more embodiments, systems and methods for quantifying a shift of an anatomical object of a patient are provided. A 3D medical image of an anatomical object of a patient is received. An initial location of landmarks on the anatomical object in the 3D medical image is determined using a first machine learning network. A 2D slice depicting the initial location of the landmarks is extracted from the 3D medical image. The initial location of the landmarks in the 2D slice is refined using a second machine learning network. A shift of the anatomical object is quantified based on the refined location of the landmarks in the 2D slice. The quantified shift of the anatomical object is output.

In one embodiment, the anatomical object of the patient comprises a brain of the patient and a midline shift of the brain is quantified based on the refined location of the landmarks in the 2D slice. The landmarks may comprise an anterior falx, a posterior falx, and a septum pallicidum of the brain. The midline shift may be quantified by calculating a perpendicular distance from the septum pallicidum to a line formed between the anterior falx and the posterior falx. The 2D slice may be extracted at an axial plane of a foramen of Monro of the brain.

In one embodiment, the 3D medical image is identified, from a plurality of 3D candidate medical images, as depicting the shift of the anatomical object using a machine learning classification network. The 3D medical image may comprise a CT (computer tomograph) medical image.

In one embodiment, the initial location of landmarks on the anatomical object in the 3D medical image is determined by generating one or more 3D landmark heatmaps identifying the initial location of the landmarks and the refined location of the landmarks in the 2D slice is determined by generating one or more 2D landmark heatmaps identifying the refined location of the landmarks.

These and other advantages of the invention will be apparent to those of ordinary skill in the art by reference to the following detailed description and the accompanying drawings.

BRIEF DESCRIPTION OF THE DRAWINGS

FIG. 2 shows an illustrative comparison between a ground truth 3D landmark heatmap and a predicted 3D landmark heatmap shown overlaid on a 3D medical image, in accordance with one or more embodiments;

DETAILED DESCRIPTION

The present invention generally relates to methods and systems for automated estimation of midline shift in brain CT (computed tomography) images. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. Further, reference herein to pixels of an image may refer equally to voxels of an image and vice versa.

Embodiments described herein provide for the automated estimation of midline shift of a brain of a patient. Midline shift is clinically defined as a shift or displacement of the brain past its centerline. Midline shift can be detected and quantified as the perpendicular distance from a midline structure located on the actual centerline of the brain to a line representing the ideal centerline of the brain. At the axial plane of the foramen of Monro, the septum pallicidum of the brain is located on the actual centerline of the brain and therefore the midline shift may be calculated as the perpendicular distance from the septum pallicidum to a line formed between the anterior falx and posterior falx. Advantageously, embodiments described herein provide for improved accuracy and efficiency of midline shift estimation and enable support for timely clinical diagnosis of brain injury.

Figure 1:
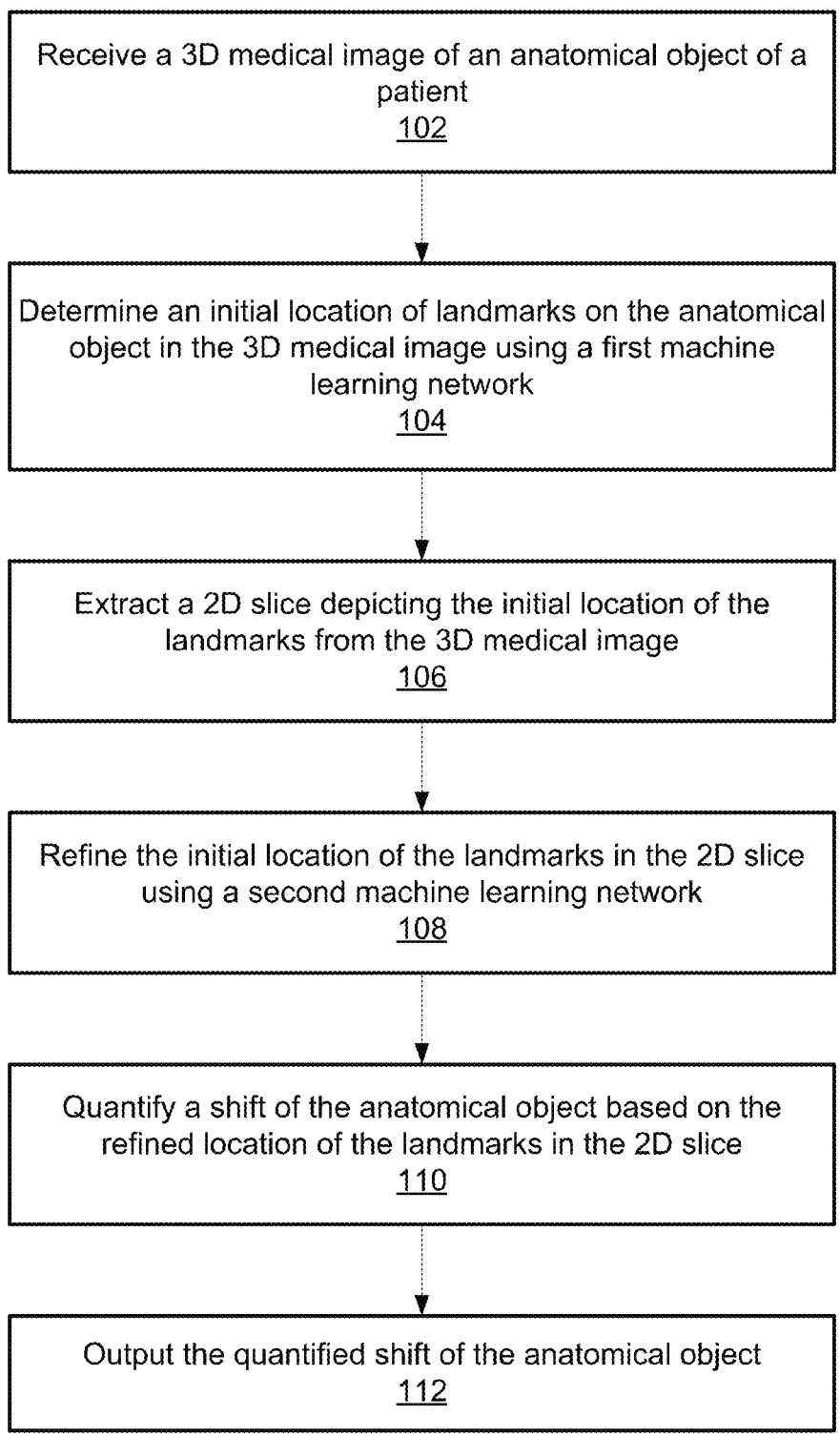
FIG. 1 shows a method for quantifying shift of an anatomical object of a patient, in accordance with one or more embodiments.

FIG. 1 shows a method 100 for quantifying shift of an anatomical object of a patient, in accordance with one or more embodiments. The steps of method 100 may be performed by one or more suitable computing devices, such as, e.g., computer 702 of FIG. 7.

At step 102, a 3D (three dimensional) medical image of an anatomical object of a patient is received. In one embodiment, the anatomical object of the patient is the brain of the patient. However, the anatomical object may be any organ, bone, lesions, or any other anatomical object of the patient.

In one embodiment, the 3D medical image is a CT image (e.g., a non-contrast CT image). However, the 3D medical image may be of any other suitable modality, such as, e.g., MRI (magnetic resonance imaging), x-ray, or any other medical imaging modality or combinations of medical imaging modalities. The 3D medical image is comprised of a plurality of 2D (two dimensional) cross sectional slices. The 3D medical image may be received directly from an image acquisition device, such as, e.g., a CT scanner, as the 3D medical image is acquired, or can be received by loading a previously acquired 3D medical image from a storage or memory of a computer system or receiving a 3D medical image that has been transmitted from a remote computer system.

In one embodiment, for example during a preprocessing stage, the 3D medical image is identified, from a plurality of 3D candidate medical images, as depicting a shift in the anatomical object (e.g., a midline shift of the brain) using a machine learning classification network. The classification network is trained to discriminate images in the plurality of 3D candidate medical images that depict and that do not depict shift in the anatomical object. The classification network may be any suitable machine learning based network, such as, e.g., a deep neural network. The classification network is trained during a prior offline or training stage, as described in further detail below with regards to FIG. 4. Once trained, the trained classification network may be applied during an online or testing stage to identify the 3D medical image, from the plurality of 3D candidate medical images, as depicting a shift in the anatomical object.

At step 104, an initial location of landmarks on the anatomical object is determined in the 3D medical image using a first machine learning network. In one embodiment, where the anatomical object is the brain of the patient, the landmarks may comprise an anterior falx, a posterior falx, and a septum pallicidum of the brain.

The first machine learning network receives the 3D medical image as input and generates one or more 3D landmark heatmaps as output. The 3D landmark heatmaps provide a voxel-wise identification of the initial location of the landmarks such that, for example, a voxel intensity value of 1 corresponds to the initial location of the landmarks and a voxel intensity value of 0 does not correspond to the initial location of the landmarks. Each of the one or more 3D landmark heatmaps identifies a respective landmark. For example, the one or more 3D landmark heatmaps may comprise a first 3D landmark heatmap identifying the anterior falx, a second 3D landmark heatmap identifying the posterior falx, and a third 3D landmark heatmap identifying the septum pallicidum.

The first machine learning network may be any suitable machine learning based network, such as, e.g., a deep neural network. The first machine learning network is trained during a prior offline or training stage, as described in further detail below with regards to FIG. 4. Once trained, the trained first machine learning network may be applied during an online or testing stage (e.g., at step 104 of FIG. 1) to determine the initial location of the landmarks in the 3D medical image.

FIG. 2 shows an illustrative comparison between a ground truth 3D landmark heatmap 202 and a predicted 3D landmark heatmap 204 shown overlaid on a 3D medical image, in accordance with one or more embodiments. Predicted 3D landmark heatmap 204 is an example of the 3D landmark heatmap generated by the first machine learning network at step 104 of FIG. 1. As shown in FIG. 2, ground truth 3D landmark heatmap 202 identifies a ground truth initial location of landmarks comprising an anterior falx 206, a septum pallicidum 208, and a posterior falx 210 of the brain and predicted 3D landmark heatmap 204 identifies a predicted initial location of landmarks comprising an anterior falx 212, a septum pallicidum 214, and a posterior falx 216 of the brain.

At step 106 of FIG. 1, a 2D slice depicting the initial location of the landmarks is extracted from the 3D medical image. The 2D slice is extracted from the 3D medical image by calculating a point coordinate of the foramen of Monro in the 3D medical image and extracting the 2D slice corresponding to the point coordinate from the 3D medical image. Accordingly, the 2D slice is the slice of the 3D medical image at the axial plane of the foramen of Monro of the brain of the patient. An exemplary 2D slice is shown as 2D slice 302 in FIG. 3, described in further detail below.

At step 108 of FIG. 1, the initial location of the landmarks in the 2D slice is refined using a second machine learning network. The initial location of the landmarks is refined to determine a more precise location of the landmarks in the 2D slice.

The second machine learning network receives the 2D slice as input and generates one or more 2D landmark heatmaps as output. The 2D landmark heatmaps provide a pixel-wise identification of the refined location of the landmarks such that, for example, a pixel intensity value of 1 corresponds to the refined location of the landmarks and a pixel intensity value of 0 does not correspond to the refined location of the landmarks. Each of the one or more 2D landmark heatmaps identifies a respective landmark. For example, the one or more 2D landmark heatmaps may comprise a first 2D landmark heatmap identifying the anterior falx, a second 2D landmark heatmap identifying the posterior falx, and a third 2D landmark heatmap identifying the septum pallicidum.

The second machine learning network may be any suitable machine learning based network, such as, e.g., a deep neural network. The second machine learning network is trained during a prior offline or training stage, as described in further detail below with regards to FIG. 4. Once trained, the trained second machine learning network may be applied during an online or testing stage (e.g., at step 108 of FIG. 1) to determine the refined location of the landmarks in the 2D slice.

Figure 3:
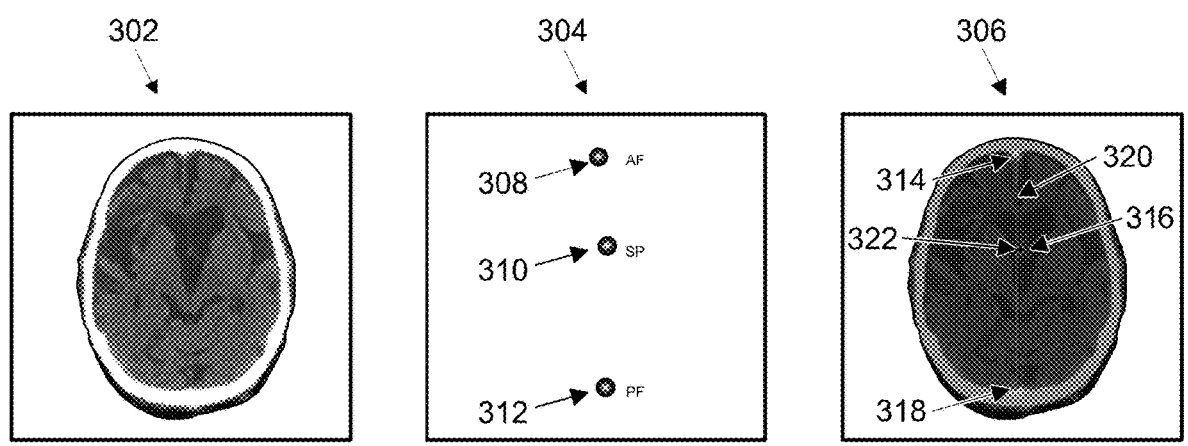
FIG. 3 shows an illustrative comparison of a ground truth 2D landmark heatmap and a predicted 2D landmark heatmap for a 2D slice, in accordance with one or more embodiments.

FIG. 3 shows an illustrative comparison of a ground truth 2D landmark heatmap 304 and a predicted 2D landmark heatmap 306 for a 2D slice 302, in accordance with one or more embodiments. Predicted 2D landmark heatmap 306 is shown overlaid on 2D slice 302. Predicted 2D landmark heatmap 306 is an example of the 2D landmark heatmap generated by the second machine learning network at step 108 of FIG. 1. As shown in FIG. 3, ground truth 2D landmark heatmap 304 identifies a ground truth refined location of landmarks comprising an anterior falx 308, a septum pallicidum 310, and a posterior falx 312 of the brain and predicted 2D landmark heatmap 306 identifies a predicted refined location of landmarks comprising an anterior falx 314, a septum pallicidum 316, and a posterior falx 318 of the brain.

At step 110 of FIG. 1, a shift of the anatomical object is quantified based on the refined location of the landmarks in the 2D slice. In one embodiment, where the anatomical object is the brain of the patient, the shift of the anatomical object comprises a midline shift of the brain. At the axial plane of the foramen of Monro, corresponding to the 2D slice, the septum pallicidum is located along the actual centerline of the brain. The line between the anterior falx and the posterior falx represents the ideal centerline of the brain. Accordingly, the midline shift may be quantified by calculating the perpendicular distance from the septum pallicidum to the line formed between the anterior falx and the posterior falx, as located based on the refined location of the landmarks in the 2D slice. For example, as shown in predicted 2D landmark heatmap 306 in FIG. 3, the midline shift is represented as the length of line 322, representing the perpendicular distance from septum pallicidum 316 to line 320 between anterior falx 314 and posterior falx 318.

In one embodiment, where the refined location of one or more of the landmarks is not determined at step 108, the initial location of the one or more of the landmarks determined at step 104 may be utilized at step 110 to quantify the shift of the anatomical object. For example, if the refined location of the septum pallicidum is not determined at step 108, the initial location of the septum pallicidum determined at step 104 is utilized to quantify the shift of the anatomical object at step 110.

At step 112 of FIG. 1, the quantified shift of the anatomical object is output. For example, the quantified shift of the anatomical object can be output by displaying the quantified shift of the anatomical object on a display device of a computer system, storing the quantified shift of the anatomical object on a memory or storage of a computer system, or by transmitting the quantified shift of the anatomical object to a remote computer system. In one embodiment, the quantified shift of the anatomical object may be output for clinical decision making. For example, the quantified shift of the anatomical object may be output to a clinical decision support system for automatically recommending a treatment or course of action for the patient based on the quantified shift.

Advantageously, embodiments described herein provide for the quantification of a shift of an anatomical object by determining an initial location of landmarks in the 3D medical image using the first machine learning network and refining the initial location of the landmarks in a 2D slice, extracted from the 3D medical image, using the second machine learning network. The determination of the location of landmarks in the 3D medical image and in the 2D slice enables effective extraction of useful image features from surrounding brain tissues. The first machine learning network predicts general regions of interest, which include the target location of the landmarks and the 2D slice at the axial place of the foramen of Monro, in the 3D medical image. The second machine learning network predicts refined locations of the landmarks on the 2D slice. In general, 3D machine learning networks require significant amount of training data and therefore it is often challenging to train such 3D networks to achieve desired performance. In accordance with embodiments described herein, the required size of the training data is reduced.

Figure 4:
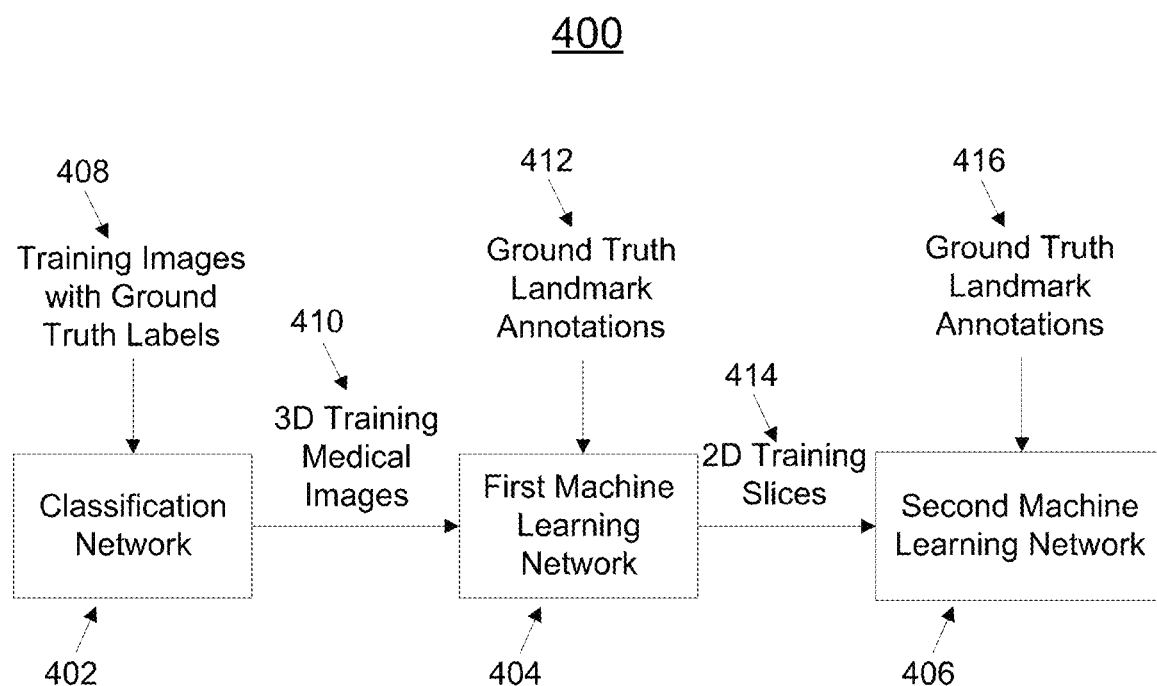
FIG. 4 shows a workflow for training machine learning networks for quantifying a shift of an anatomical object of a patient, in accordance with one or more embodiments.

FIG. 4 shows a workflow 400 for training machine learning networks for quantifying a shift of an anatomical object of a patient, in accordance with one or more embodiments. As shown in FIG. 4, workflow 400 is performed for training classification network 402, first machine learning network 404, and second machine learning network 406. In one example, classification network 402 is the classification network applied to identify the 3D medical image, from a plurality of 3D candidate medical images, received at step 102 of FIG. 1, first machine learning network 404 is the first machine learning network applied to determine an initial location of landmarks in the 3D medical image at step 104 of FIG. 1, and second machine learning network 406 is the second machine learning network applied to refined the initial location of the landmarks in the 2D slice at step 108 of FIG. 1.

Workflow 400 is performed during a prior training or offline stage to train the machine learning networks for performing various medical imaging analysis tasks. Classification network 402, first machine learning network 404, and second machine learning network 406 are trained independently. Once trained, the trained machine learning networks are applied during an online or testing stage (e.g., at method 100 of FIG. 1). Classification network 402, first machine learning network 404, and second machine learning network 406 may be implemented using any suitable machine learning network. In one example, classification network 402, first machine learning network 404, and/or second machine learning network 406 are deep learning neural networks.

Classification network 402 is trained with training images with associated ground truth labels 408 to classify the training images as depicting a shift of an anatomical object (e.g., a midline shift of the brain). The ground truth labels may be manually annotated labels indicating whether the training images depicted a shift of the anatomical object.

First machine learning network 404 is trained with 3D training medical images 410 and corresponding ground truth landmark annotations 412. 3D training medical images 410 are the training images classified as depicting a shift of the anatomical object by classification network 402. Ground truth landmark annotations 412 are 3D training landmark heatmaps created by applying a 2D Gaussian smoothing kernel to landmarks (e.g., anterior falx, posterior falx, and septum pallicidum of the brain). To increase axial information density, the 3D training landmark heatmaps are generated by stacking multiple 2D heatmaps. The center of the landmarks in the 3D training landmark heatmaps represent the ground truth location of the landmarks. In one example, 11 2D heatmap may be stacked to form the 3D training landmark heatmaps, however any other suitable number of 2D heatmaps may be utilized to generated the 3D training landmark heatmaps, e.g., depending on the CT acquisition protocol.

Second machine learning network 406 are trained with 2D training slices 414 and ground truth landmark annotations 416. 2D training slices 414 are 2D slices extracted from the 3D landmark heatmaps generated by first machine learning network 404 at the axial plane of the foramen of Monro of the brain. Ground truth landmark annotations 416 are 2D training landmark heatmaps created by applying a 3D Gaussian smoothing kernel to landmarks.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based networks (or models), as well as with respect to methods and systems for training machine learning based networks. Features, advantages or alternative embodiments herein can be assigned to the other claimed objects and vice versa. In other words, claims for methods and systems for training a machine learning based network can be improved with features described or claimed in context of the methods and systems for utilizing a trained machine learning based network, and vice versa.

In particular, the trained machine learning based networks applied in embodiments described herein can be adapted by the methods and systems for training the machine learning based networks. Furthermore, the input data of the trained machine learning based network can comprise advantageous features and embodiments of the training input data, and vice versa. Furthermore, the output data of the trained machine learning based network can comprise advantageous features and embodiments of the output training data, and vice versa.

In general, a trained machine learning based network mimics cognitive functions that humans associate with other human minds. In particular, by training based on training data, the trained machine learning based network is able to adapt to new circumstances and to detect and extrapolate patterns.

In general, parameters of a machine learning based network can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based network can be adapted iteratively by several steps of training.

In particular, a trained machine learning based network can comprise a neural network, a support vector machine, a decision tree, and/or a Bayesian network, and/or the trained machine learning based network can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 5:
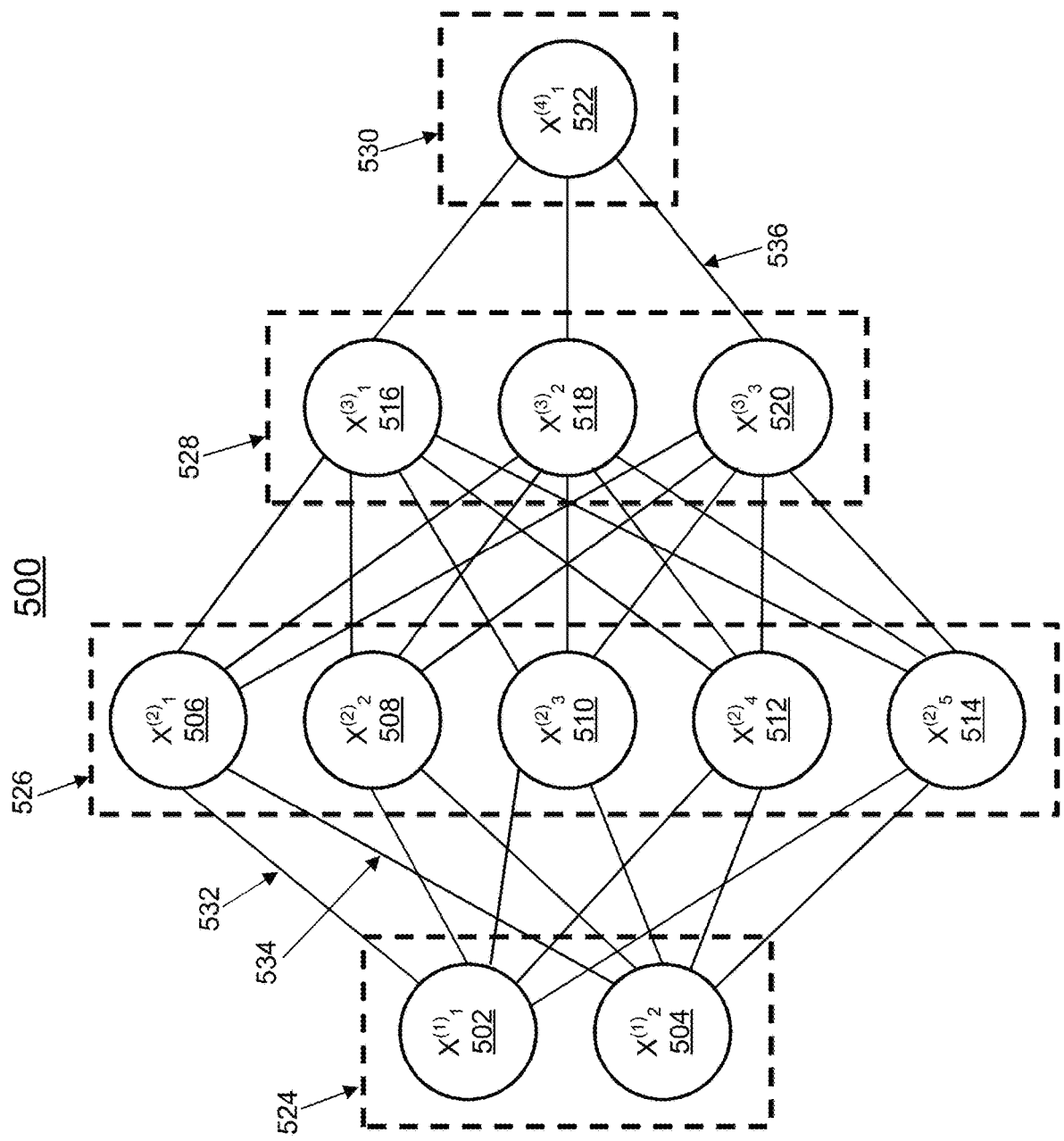
FIG. 5 shows an exemplary artificial neural network that may be used to implement one or more embodiments.

FIG. 5 shows an embodiment of an artificial neural network 500, in accordance with one or more embodiments. Alternative terms for "artificial neural network" are "neural network", "artificial neural net" or "neural net". Machine learning networks described herein, such as, e.g., the classification network, the first machine learning network, and the second machine learning network utilized in method 100 of FIG. 1 and the classification network 402, the first machine learning network 404, and the second machine learning network 406 in workflow 400 of FIG. 4, may be implemented using artificial neural network 500.

The artificial neural network 500 comprises nodes 502-522 and edges 532, 534, . . . , 536, wherein each edge 532, 534, . . . , 536 is a directed connection from a first node 502-522 to a second node 502-522. In general, the first node 502-522 and the second node 502-522 are different nodes 502-522, it is also possible that the first node 502-522 and the second node 502-522 are identical. For example, in FIG. 5, the edge 532 is a directed connection from the node 502 to the node 506, and the edge 534 is a directed connection from the node 504 to the node 506. An edge 532, 534, . . . , 536 from a first node 502-522 to a second node 502-522 is also denoted as "ingoing edge" for the second node 502-522 and as "outgoing edge" for the first node 502-522.

In this embodiment, the nodes 502-522 of the artificial neural network 500 can be arranged in layers 524-530, wherein the layers can comprise an intrinsic order introduced by the edges 532, 534, . . . , 536 between the nodes 502-522. In particular, edges 532, 534, . . . , 536 can exist only between neighboring layers of nodes. In the embodiment shown in FIG. 5, there is an input layer 524 comprising only nodes 502 and 504 without an incoming edge, an output layer 530 comprising only node 522 without outgoing edges, and hidden layers 526, 528 in-between the input layer 524 and the output layer 530. In general, the number of hidden layers 526, 528 can be chosen arbitrarily. The number of nodes 502 and 504 within the input layer 524 usually relates to the number of input values of the neural network 500, and the number of nodes 522 within the output layer 530 usually relates to the number of output values of the neural network 500.

In particular, a (real) number can be assigned as a value to every node 502-522 of the neural network 500. Here, $x^{(n)}_i$ denotes the value of the i-th node 502-522 of the n-th layer 524-530. The values of the nodes 502-522 of the input layer 524 are equivalent to the input values of the neural network 500, the value of the node 522 of the output layer 530 is equivalent to the output value of the neural network 500. Furthermore, each edge 532, 534, . . . , 536 can comprise a weight being a real number, in particular, the weight is a real number within the interval $[-1, 1]$ or within the interval $[0, 1]$. Here, $w^{(m,n)}_{i,j}$ denotes the weight of the edge between the i-th node 502-522 of the m-th layer 524-530 and the j-th node 502-522 of the n-th layer 524-530. Furthermore, the abbreviation $w^{(n)}_{i,j}$ is defined for the weight $w^{(n,n+1)}_{i,j}$.

In particular, to calculate the output values of the neural network 500, the input values are propagated through the neural network. In particular, the values of the nodes 502-522 of the (n+1)-th layer 524-530 can be calculated based on the values of the nodes 502-522 of the n-th layer 524-530 by $$x_j^{(n+1)} = f(\Sigma_i x_i^{(n)} \cdot w_{i,j}^{(n)}).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 524 are given by the input of the neural network 500, wherein values of the first hidden layer 526 can be calculated based on the values of the input layer 524 of the neural network, wherein values of the second hidden layer 528 can be calculated based in the values of the first hidden layer 526, etc.

In order to set the values $w^{(m,n)}_{i,j}$ for the edges, the neural network 500 has to be trained using training data. In particular, training data comprises training input data and training output data (denoted as $t_i$). For a training step, the neural network 500 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 500 (backpropagation algorithm). In particular, the weights are changed according to $$w'^{(n)}_{i,j} = w^{(n)}_{i,j} - \gamma \cdot \delta^{(n)}_j \cdot x^{(n)}_i$$

wherein $\gamma$ is a learning rate, and the numbers $\delta^{(n)}_j$ can be recursively calculated as $$\delta^{(n)}_j = (\Sigma_k \delta^{(n+1)}_k \cdot w^{(n+1)}_{j,k}) \cdot f'(\Sigma_i x^{(n)}_i \cdot w^{(n)}_{i,j})$$

based on $\delta^{(n+1)}_j$, if the (n+1)-th layer is not the output layer, and $$\delta^{(n)}_j = (x^{(n+1)}_k - t^{(n+1)}_j) \cdot f'(\Sigma_i x^{(n)}_i \cdot w^{(n)}_{i,j})$$

if the (n+1)-th layer is the output layer 530, wherein f' is the first derivative of the activation function, and $y^{(n+1)}_j$ is the comparison training value for the j-th node of the output layer 530.

Figure 6:
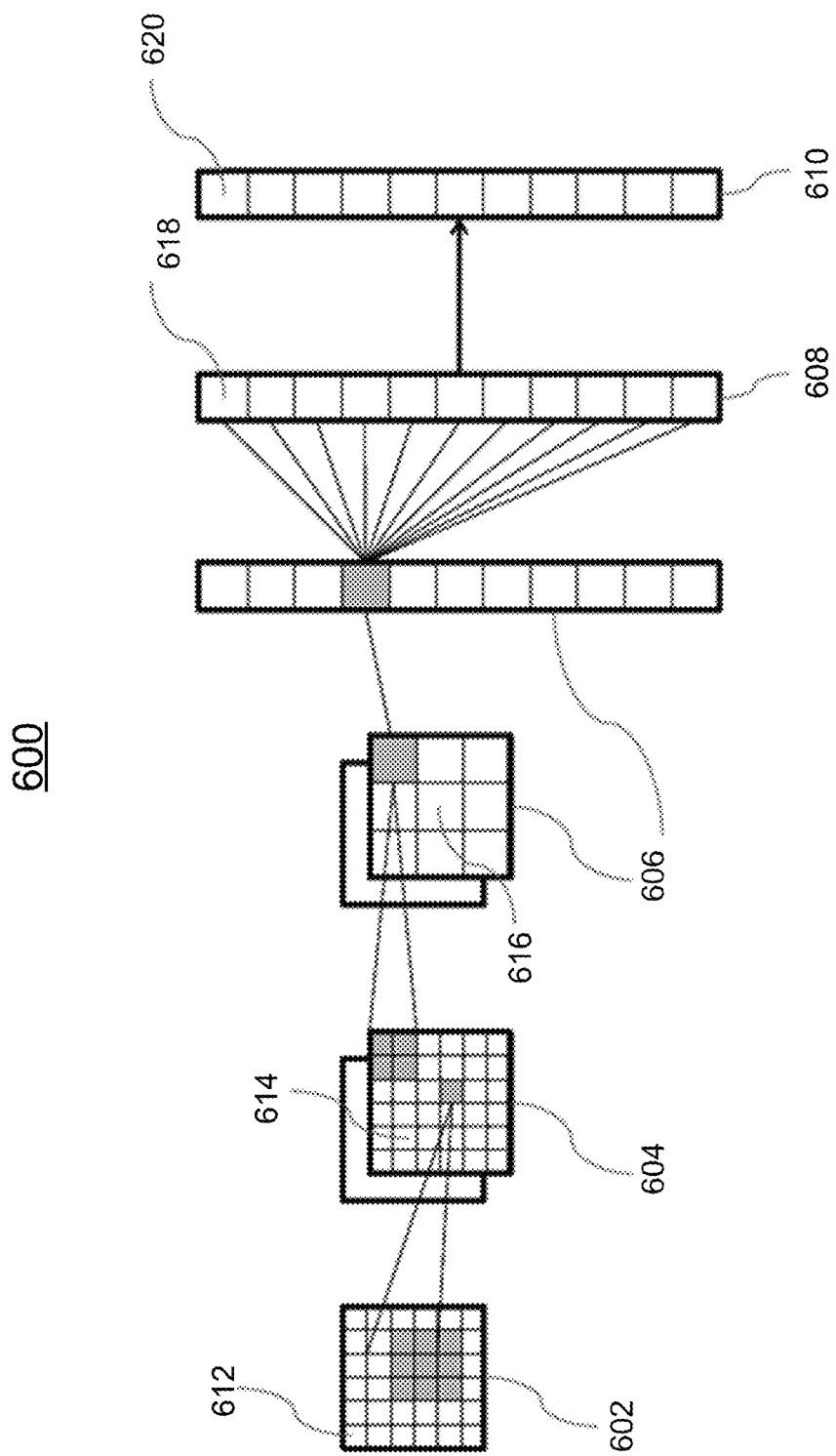
FIG. 6 shows a convolutional neural network that may be used to implement one or more embodiments.

FIG. 6 shows a convolutional neural network 600, in accordance with one or more embodiments. Machine learning networks described herein, such as, e.g., the classification network, the first machine learning network, and the second machine learning network utilized in method 100 of FIG. 1 and the classification network 402, the first machine learning network 404, and the second machine learning network 406 in workflow 400 of FIG. 4, may be implemented using convolutional neural network 600.

In the embodiment shown in FIG. 6, the convolutional neural network comprises 600 an input layer 602, a convolutional layer 604, a pooling layer 606, a fully connected layer 608, and an output layer 610. Alternatively, the convolutional neural network 600 can comprise several convolutional layers 604, several pooling layers 606, and several fully connected layers 608, as well as other types of layers. The order of the layers can be chosen arbitrarily, usually fully connected layers 608 are used as the last layers before the output layer 610.

In particular, within a convolutional neural network 600, the nodes 612-620 of one layer 602-610 can be considered to be arranged as a d-dimensional matrix or as a d-dimensional image. In particular, in the two-dimensional case the value of the node 612-620 indexed with i and j in the n-th layer 602-610 can be denoted as $x^{(n)}_{[i,j]}$. However, the arrangement of the nodes 612-620 of one layer 602-610 does not have an effect on the calculations executed within the convolutional neural network 600 as such, since these are given solely by the structure and the weights of the edges.

In particular, a convolutional layer 604 is characterized by the structure and the weights of the incoming edges forming a convolution operation based on a certain number of kernels. In particular, the structure and the weights of the incoming edges are chosen such that the values $x^{(n)}_k$ of the nodes 614 of the convolutional layer 604 are calculated as a convolution $x^{(n)}_k = K_k * x^{(n-1)}$ based on the values $x^{(n-1)}$ of the nodes 612 of the preceding layer 602, where the convolution * is defined in the two-dimensional case as $$x^{(n)}_k[i,j] = (K_k * x^{(n-1)})[i,j] = \Sigma_{i'} \Sigma_{j'} K_k[i',j'] \cdot x^{(n-1)}[i-i',j-j'].$$

Here the k-th kernel $K_k$ is a d-dimensional matrix (in this embodiment a two-dimensional matrix), which is usually small compared to the number of nodes 612-618 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 612-620 in the respective layer 602-610. In particular, for a convolutional layer 604, the number of nodes 614 in the convolutional layer is equivalent to the number of nodes 612 in the preceding layer 602 multiplied with the number of kernels.

If the nodes 612 of the preceding layer 602 are arranged as a d-dimensional matrix, using a plurality of kernels can be interpreted as adding a further dimension (denoted as "depth" dimension), so that the nodes 614 of the convolutional layer 604 are arranged as a (d+1)-dimensional matrix. If the nodes 612 of the preceding layer 602 are already arranged as a (d+1)-dimensional matrix comprising a depth dimension, using a plurality of kernels can be interpreted as expanding along the depth dimension, so that the nodes 614 of the convolutional layer 604 are arranged also as a (d+1)-dimensional matrix, wherein the size of the (d+1)-dimensional matrix with respect to the depth dimension is by a factor of the number of kernels larger than in the preceding layer 602.

The advantage of using convolutional layers 604 is that spatially local correlation of the input data can exploited by enforcing a local connectivity pattern between nodes of adjacent layers, in particular by each node being connected to only a small region of the nodes of the preceding layer.

In embodiment shown in FIG. 6, the input layer 602 comprises 36 nodes 612, arranged as a two-dimensional 6×6 matrix. The convolutional layer 604 comprises 72 nodes 614, arranged as two two-dimensional 6×6 matrices, each of the two matrices being the result of a convolution of the values of the input layer with a kernel. Equivalently, the nodes 614 of the convolutional layer 604 can be interpreted as arranges as a three-dimensional 6×6×2 matrix, wherein the last dimension is the depth dimension.

A pooling layer 606 can be characterized by the structure and the weights of the incoming edges and the activation function of its nodes 616 forming a pooling operation based on a non-linear pooling function f. For example, in the two dimensional case the values $x^{(n)}$ of the nodes 616 of the pooling layer 606 can be calculated based on the values $x^{(n-1)}$ of the nodes 614 of the preceding layer 604 as $$x^{(n)}[i,j] = f(x^{(n-1)}[id_1, jd_2], \ldots, x^{(n-1)}[id_1+d_1-1, jd_2+d_2-1])$$

In other words, by using a pooling layer 606, the number of nodes 614, 616 can be reduced, by replacing a number d1·d2 of neighboring nodes 614 in the preceding layer 604 with a single node 616 being calculated as a function of the values of said number of neighboring nodes in the pooling layer. In particular, the pooling function f can be the max-function, the average or the L2-Norm. In particular, for a pooling layer 606 the weights of the incoming edges are fixed and are not modified by training.

The advantage of using a pooling layer 606 is that the number of nodes 614, 616 and the number of parameters is reduced. This leads to the amount of computation in the network being reduced and to a control of overfitting.

In the embodiment shown in FIG. 6, the pooling layer 606 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 608 can be characterized by the fact that a majority, in particular, all edges between nodes 616 of the previous layer 606 and the nodes 618 of the fully-connected layer 608 are present, and wherein the weight of each of the edges can be adjusted individually.

In this embodiment, the nodes 616 of the preceding layer 606 of the fully-connected layer 608 are displayed both as two-dimensional matrices, and additionally as non-related nodes (indicated as a line of nodes, wherein the number of nodes was reduced for a better presentability). In this embodiment, the number of nodes 618 in the fully connected layer 608 is equal to the number of nodes 616 in the preceding layer 606. Alternatively, the number of nodes 616, 618 can differ.

Furthermore, in this embodiment, the values of the nodes 620 of the output layer 610 are determined by applying the Softmax function onto the values of the nodes 618 of the preceding layer 608. By applying the Softmax function, the sum the values of all nodes 620 of the output layer 610 is 1, and all values of all nodes 620 of the output layer are real numbers between 0 and 1.

A convolutional neural network 600 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 600 can be trained based on the backpropagation algorithm. For preventing overfitting, methods of regularization can be used, e.g. dropout of nodes 612-620, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 1 or 4. Certain steps or functions of the methods and workflows described herein, including one or more of the steps or functions of FIG. 1 or 4, may be performed by a server or by another processor in a network-based cloud-computing system. Certain steps or functions of the methods and workflows described herein, including one or more of the steps of FIG. 1 or 4, may be performed by a client computer in a network-based cloud computing system. The steps or functions of the methods and workflows described herein, including one or more of the steps of FIG. 1 or 4, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 1 or 4, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
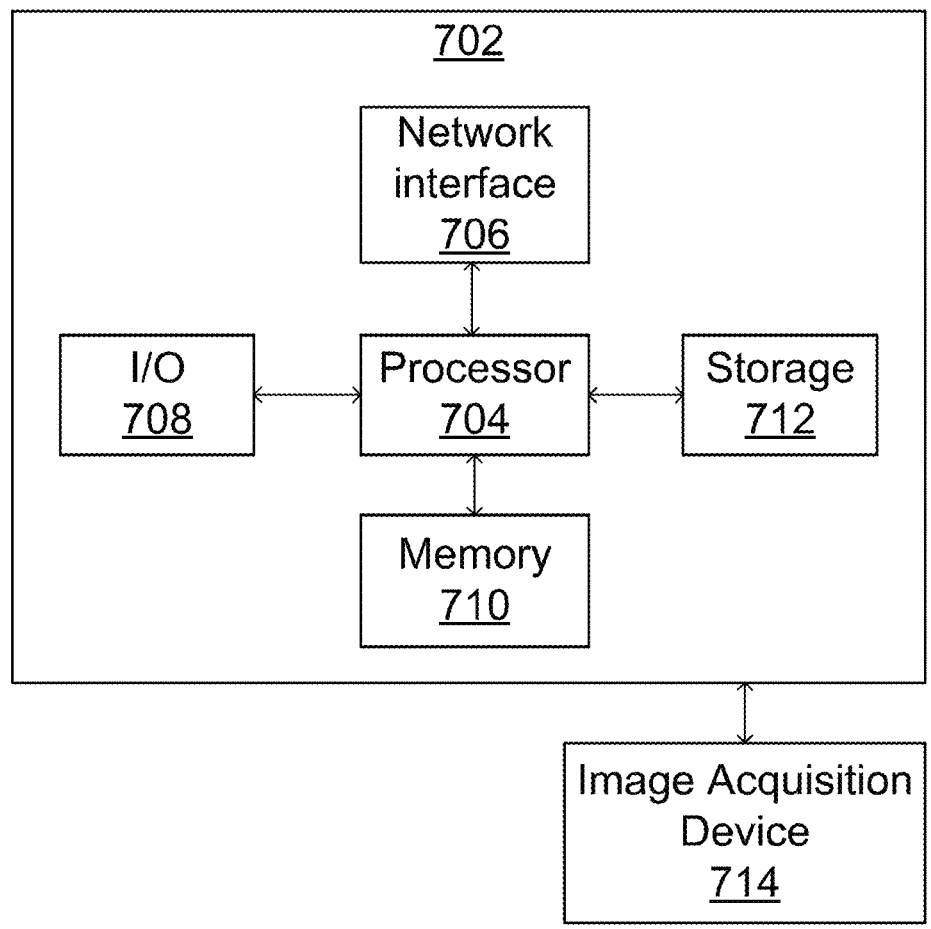
FIG. 7 shows a high-level block diagram of a computer that may be used to implement one or more embodiments.

A high-level block diagram of an example computer 702 that may be used to implement systems, apparatus, and methods described herein is depicted in FIG. 7. Computer 702 includes a processor 704 operatively coupled to a data storage device 712 and a memory 710. Processor 704 controls the overall operation of computer 702 by executing computer program instructions that define such operations. The computer program instructions may be stored in data storage device 712, or other computer readable medium, and loaded into memory 710 when execution of the computer program instructions is desired. Thus, the method and workflow steps or functions of FIG. 1 or 4 can be defined by the computer program instructions stored in memory 710 and/or data storage device 712 and controlled by processor 704 executing the computer program instructions. For example, the computer program instructions can be implemented as computer executable code programmed by one skilled in the art to perform the method and workflow steps or functions of FIG. 1 or 4. Accordingly, by executing the computer program instructions, the processor 704 executes the method and workflow steps or functions of FIG. 1 or 4. Computer 702 may also include one or more network interfaces 706 for communicating with other devices via a network. Computer 702 may also include one or more input/output devices 708 that enable user interaction with computer 702 (e.g., display, keyboard, mouse, speakers, buttons, etc.).

Processor 704 may include both general and special purpose microprocessors, and may be the sole processor or one of multiple processors of computer 702. Processor 704 may include one or more central processing units (CPUs), for example. Processor 704, data storage device 712, and/or memory 710 may include, be supplemented by, or incorporated in, one or more application-specific integrated circuits (ASICs) and/or one or more field programmable gate arrays (FPGAs).

Data storage device 712 and memory 710 each include a tangible non-transitory computer readable storage medium. Data storage device 712, and memory 710, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor storage devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 708 may include peripherals, such as a printer, scanner, display screen, etc. For example, input/output devices 708 may include a display device such as a cathode ray tube (CRT) or liquid crystal display (LCD) monitor for displaying information to the user, a keyboard, and a pointing device such as a mouse or a trackball by which the user can provide input to computer 702.

An image acquisition device 714 can be connected to the computer 702 to input image data (e.g., medical images) to the computer 702. It is possible to implement the image acquisition device 714 and the computer 702 as one device. It is also possible that the image acquisition device 714 and the computer 702 communicate wirelessly through a network. In a possible embodiment, the computer 702 can be located remotely with respect to the image acquisition device 714.

Any or all of the systems and apparatus discussed herein may be implemented using one or more computers such as computer 702.

One skilled in the art will recognize that an implementation of an actual computer or computer system may have other structures and may contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method comprising:
receiving a 3D medical image of an anatomical object of a patient;
determining an initial location of landmarks on the anatomical object in the 3D medical image using a first machine learning network;
extracting a 2D slice depicting the initial location of the landmarks from the 3D medical image;
refining the initial location of the landmarks in the 2D slice using a second machine learning network;
quantifying a shift of the anatomical object based on the refined location of the landmarks in the 2D slice; and
outputting the quantified shift of the anatomical object.

2. The computer-implemented method of claim 1, wherein the anatomical object of the patient comprises a brain of the patient and quantifying a shift of the anatomical object based on the refined location of the landmarks in the 2D slice comprises:
quantifying a midline shift of the brain based on the refined location of the landmarks in the 2D slice.

3. The computer-implemented method of claim 2, wherein the landmarks comprise an anterior falx, a posterior falx, and a septum pallicidum of the brain.

4. The computer-implemented method of claim 3, wherein quantifying a midline shift of the brain based on the refined location of the landmarks in the 2D slice comprises:
calculating a perpendicular distance from the septum pallicidum to a line formed between the anterior falx and the posterior falx.

5. The computer-implemented method of claim 3, wherein extracting a 2D slice depicting the initial location of the landmarks from the 3D medical image comprises:
extracting the 2D slice at an axial plane of a foramen of Monro of the brain.

6. The computer-implemented method of claim 1, further comprising:
identifying the 3D medical image, from a plurality of 3D candidate medical images, as depicting the shift of the anatomical object using a machine learning classification network.

7. The computer-implemented method of claim 1, wherein determining an initial location of landmarks on the anatomical object in the 3D medical image using a first machine learning network comprises:
generating one or more 3D landmark heatmaps identifying the initial location of the landmarks.

8. The computer-implemented method of claim 1, wherein refining the initial location of the landmarks in the 2D slice using a second machine learning network comprises:
generating one or more 2D landmark heatmaps identifying the refined location of the landmarks.

9. The computer-implemented method of claim 1, wherein the 3D medical image comprises a CT (computed tomography) medical image.

10. An apparatus comprising:
means for receiving a 3D medical image of an anatomical object of a patient;
means for determining an initial location of landmarks on the anatomical object in the 3D medical image using a first machine learning network;
means for extracting a 2D slice depicting the initial location of the landmarks from the 3D medical image;
means for refining the initial location of the landmarks in the 2D slice using a second machine learning network;

means for quantifying a shift of the anatomical object based on the refined location of the landmarks in the 2D slice; and means for outputting the quantified shift of the anatomical object.

11. The apparatus of claim 10, wherein the anatomical object of the patient comprises a brain of the patient and the means for quantifying a shift of the anatomical object based on the refined location of the landmarks in the 2D slice comprises:

means for quantifying a midline shift of the brain based on the refined location of the landmarks in the 2D slice.

12. The apparatus of claim 11, wherein the landmarks comprise an anterior falx, a posterior falx, and a septum pallicidum of the brain.

13. The apparatus of claim 12, wherein the means for quantifying a midline shift of the brain based on the refined location of the landmarks in the 2D slice comprises:

means for calculating a perpendicular distance from the septum pallicidum to a line formed between the anterior falx and the posterior falx.

14. The apparatus of claim 12, wherein the means for extracting a 2D slice depicting the initial location of the landmarks from the 3D medical image comprises:

means for extracting the 2D slice at an axial plane of a foramen of Monro of the brain.

15. A non-transitory computer readable medium storing computer program instructions, the computer program instructions when executed by a processor cause the processor to perform operations comprising:

receiving a 3D medical image of an anatomical object of a patient;

determining an initial location of landmarks on the anatomical object in the 3D medical image using a first machine learning network;

extracting a 2D slice depicting the initial location of the landmarks from the 3D medical image;

refining the initial location of the landmarks in the 2D slice using a second machine learning network;

quantifying a shift of the anatomical object based on the refined location of the landmarks in the 2D slice; and outputting the quantified shift of the anatomical object.

16. The non-transitory computer readable medium of claim 15, wherein the anatomical object of the patient comprises a brain of the patient and quantifying a shift of the anatomical object based on the refined location of the landmarks in the 2D slice comprises:

quantifying a midline shift of the brain based on the refined location of the landmarks in the 2D slice.

17. The non-transitory computer readable medium of claim 15, the operations further comprising:

identifying the 3D medical image, from a plurality of 3D candidate medical images, as depicting the shift of the anatomical object using a machine learning classification network.

18. The non-transitory computer readable medium of claim 15, wherein determining an initial location of landmarks on the anatomical object in the 3D medical image using a first machine learning network comprises:

generating one or more 3D landmark heatmaps identifying the initial location of the landmarks.

19. The non-transitory computer readable medium of claim 15, wherein refining the initial location of the landmarks in the 2D slice using a second machine learning network comprises:

generating one or more 2D landmark heatmaps identifying the refined location of the landmarks.

20. The non-transitory computer readable medium of claim 15, wherein the 3D medical image comprises a CT (computed tomography) medical image.

* * * * *